(12) United States Patent
Cheng et al.

(10) Patent No.: US 6,180,691 B1
(45) Date of Patent: Jan. 30, 2001

(54) PROCESSES FOR PREPARING INK JET INKS

(75) Inventors: Chieh-Min Cheng, Rochester; Garland J. Nichols, Ontario; Min-Hong Fu, Webster, all of NY (US)

(73) Assignee: Xerox Corporation, Stamford, CT (US)

( * ) Notice: Under 35 U.S.C. 154(b), the term of this patent shall be extended for 0 days.

(21) Appl. No.: 09/365,386

(22) Filed: Aug. 2, 1999

(51) Int. Cl.⁷ .................. C09D 11/10; C08L 37/00; C08L 33/08; C08L 33/10; C08L 33/02; C08L 63/00; C08F 224/00; C08F 220/06; C08F 220/10

(52) U.S. Cl. .......... 523/160; 524/517; 524/556; 524/802; 526/273; 526/319; 526/317.1; 523/412

(58) Field of Search .................. 523/160, 161, 523/407, 410, 412, 423; 106/31.27, 31.28, 31.6, 31.59, 31.89; 524/504, 517, 522, 523, 556, 802, 845; 526/266, 273, 319, 317.1, 323.2

(56) References Cited

U.S. PATENT DOCUMENTS

| | | | |
|---|---|---|---|
| 4,463,359 | 7/1984 | Ayata et al. | 346/1.1 |
| 4,686,260 * | 8/1987 | Lindemann et al. | 524/458 |
| 4,820,346 * | 4/1989 | Nowak | 564/169 |
| 4,973,614 * | 11/1990 | Yoshino et al. | 523/407 |
| 5,278,020 | 1/1994 | Grushkin et al. | 430/137 |
| 5,290,654 | 3/1994 | Sacripante et al. | 430/137 |
| 5,308,734 | 5/1994 | Sacripante et al. | 430/137 |
| 5,344,738 | 9/1994 | Kmiecik-Lawrynowicz et al. | 430/137 |
| 5,346,797 | 9/1994 | Kmiecik-Lawrynowicz et al. | 430/137 |
| 5,348,832 | 9/1994 | Sacripante et al. | 430/109 |
| 5,364,729 | 11/1994 | Kmiecik-Lawrynowicz et al. | 430/137 |
| 5,366,841 | 11/1994 | Patel et al. | 430/137 |
| 5,370,963 | 12/1994 | Patel et al. | 430/137 |
| 5,403,693 | 4/1995 | Patel et al. | 430/137 |
| 5,405,728 | 4/1995 | Hopper et al. | 430/137 |
| 5,418,108 | 5/1995 | Kmiecik-Lawrynowicz et al. | 430/137 |
| 5,496,676 | 3/1996 | Croucher et al. | 430/137 |
| 5,501,935 | 3/1996 | Patel et al. | 430/137 |
| 5,527,658 | 6/1996 | Hopper et al. | 430/137 |
| 5,539,038 * | 7/1996 | Katsen et al. | 524/399 |
| 5,585,215 | 12/1996 | Ong et al. | 430/137 |
| 5,650,255 | 7/1997 | Ng et al. | 430/137 |
| 5,650,256 | 7/1997 | Veregin et al. | 430/137 |
| 5,712,339 * | 1/1998 | Guerin et al. | 524/515 |
| 5,744,519 * | 4/1998 | Heraud et al. | 523/160 |
| 5,760,124 * | 6/1998 | Listigovers et al. | 524/505 |
| 5,762,695 | 6/1998 | Wong et al. | 106/31.89 |
| 5,814,685 * | 9/1998 | Satake et al. | 523/201 |
| 5,830,927 * | 11/1998 | Vanderhoff et al. | 522/81 |
| 5,837,043 | 11/1998 | Wong et al. | 106/31.58 |
| 5,854,313 * | 12/1998 | Omori et al. | 523/406 |
| 5,912,280 * | 6/1999 | Anton et al. | 523/161 |
| 5,977,210 * | 11/1999 | Patel et al. | 523/161 |
| 5,981,651 * | 11/1999 | Patel et al. | 524/773 |
| 6,022,403 * | 2/2000 | Kuo | 106/31.86 |
| 6,039,796 * | 3/2000 | Kubota et al. | 106/31.6 |

* cited by examiner

Primary Examiner—Vasu Jagannathan
Assistant Examiner—Callie E. Shosho
(74) Attorney, Agent, or Firm—E. D. Palazzo

(57) ABSTRACT

A process for the preparation of an ink which comprises mixing an ink vehicle, a colorant and a latex containing a polymer with epoxy groups, and wherein said latex is generated by the polymerization of a mixture of olefinic monomers, and wherein at least one of said olefinic monomers is an unsaturated epoxide monomer and which polymerization is accomplished in the presence of an anionic surfactant, and a nonionic surfactant.

43 Claims, No Drawings

PROCESSES FOR PREPARING INK JET INKS

PENDING APPLICATIONS AND PATENTS

Disclosed in U.S. Pat. No. 5,837,043 and U.S. Pat. No. 5,762,695, the disclosures of each application being totally incorporated herein by reference in their entirety, are inks with certain surfactants. More specifically, in U.S. Pat. No. 5,762,695, there is disclosed an ink jet ink and imaging process which comprises the development of an image with an aqueous ink jet ink composition comprised of colorant, water, and a polyhydroxy alcohol surfactant present in an amount of from about 2 to about 10 weight percent.

The following applications, the disclosures of each being totally incorporated herein by reference, relate to ink jet inks:

U.S. Pat. No. 5,973,026 relating to an aqueous ink containing a dissipatable polymer, colorant and a zwitterionic component like betaine;

U.S. Pat. No. 5,977,209 relating to an ink containing a colorant, polymer, such as a dissipatable polymer, vehicle, and a salt of polyacrylic, a salt of polyamic acid, a salt of alginic acid, or mixtures thereof;

U.S. Pat. No. 5,969,003 relating to an ink containing a resin of a dissipatable sulfonated polyester terminated with acrylic or methacrylic acid groups; and U.S. Pat. No. 5,938,827 relating to an ink containing a mixture of two black colorants, betaine, and N,N'-bis(3-aminopropyl) ethylenediamine.

Emulsion/aggregation/coalescence processes for the preparation of toners are illustrated in a number of Xerox patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256 and 5,501,935.

The appropriate components and processes of the above applications and patents may be selected for the present invention in embodiments thereof.

BACKGROUND OF THE INVENTION

The present invention is generally directed to ink compositions, and processes thereof, and more specifically, the present invention is directed to processes for the preparation of colored aqueous ink compositions particularly suitable for use in ink jet printing processes, and especially thermal ink jet processes, and other similar processes, and wherein there is permitted minimal or no koagation, inks with suitable particle sizes, minimal intercolor bleed for the images developed, and wherein paper curl is minimized and image smearing is minimal, or avoided. The inks in embodiments of the present invention are comprised of an ink vehicle, colorant, and additives, and wherein the inks can be prepared by blending and optionally heating an epoxy monomer latex and preferably a copolymer of unsaturated epoxide monomers and ethylenically unsaturated monomers, wherein the ethylenically unsaturated monomers are ethylenically unsaturated esters, styrene functional monomers or olefinic acids, and a colorant dispersion, and wherein the latex can be prepared by emulsion polymerization using two surfactants of for example an anionic surfactant and a nonionic surfactant.

PRIOR ART

Ink jet printing can be considered a non-impact method that produces droplets of ink that are deposited on a substrate, such as paper or transparent film, in response to an electronic digital signal. Thermal or bubble jet drop-on-demand ink jet printers are useful as outputs for personal computers in the office and in the home.

In existing thermal ink jet printing, the print head typically comprises one or more ink jet ejectors, such as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. As the bubble begins to collapse, the ink remaining in the channel between the nozzle and bubble starts to move toward the collapsing bubble, causing a volumetric contraction of the ink at the nozzle and resulting in the separation from the nozzle of the bulging ink as a droplet. The feed of additional ink provides the momentum and velocity for propelling the droplet towards a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

Ink jet inks, and processes thereof are illustrated, for example, in U.S. Pat. Nos. 4,840,674; 5,021,802; 5,041,161; 4,853,036; 5,124,718; 5,065,167 and 5,043,084, the disclosures of which are totally incorporated herein by reference.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some systems, a relatively small printhead moves across a print sheet numerous times in swathes, much like a typewriter. Alternatively, a printhead, which consists of an array of ejectors and extends the full width of the print sheet, may be passed once down the print sheet to give full-page images in what is known as a "full-width array" (FWA) printer. When the printhead and the print sheet are moved relative to each other, imagewise digital data is used to selectively activate the thermal energy generators in the printhead to permit the desired image to be created on the print sheet.

With the demand for higher resolution printers, the nozzles in ink jet printers are decreasing in size. Nozzle openings are typically about 50 to about 80 micrometers in width or diameter for 300 spi printers. With the advent of 600 spi printers, these nozzle openings are typically about 10 to about 40 micrometers in width or diameter. These small dimensions normally require inks that do not plug the small openings.

An important requirement for ink jet ink is the ability of the ink to remain stable with minimal or no settling, the ability of the ink to remain in a fluid condition in a printhead opening on exposure to air, and moreover wherein when the inks are selected for ink jet printing there is minimized paper curl, or wherein paper curl can be controlled. Also of importance is the latency or decap time, which is the length of time over which an ink remains fluid in a printhead opening or nozzle when exposed to air and, therefore, is capable of firing a drop of ink at its intended target. Latency is considered, for example, the maximum idling times allowed for ink to be jetted by a printer with a speed equal to or greater than about 5 m/s (equivalent to an ink traveling a distance of 0.5 millimeters in less than 100 μs) without a failure. This measurement can be accomplished with the printhead or nozzles uncovered or decapped and generally at a relative humidity of about 15 percent. The time interval is the longest length of time that the printhead, uncovered, will still fire or eject a specified drop without drop displacement or loss of density. The longer the latency time rating, the more desirable the ink. The inks of the present invention possess many of these characteristics in embodiments thereof.

Moreover, an important requirement for ink jet inks, especially for pigment, such as carbon black, based inks, is for the pigment dispersion to remain stable throughout the life of the ink jet cartridge. Dye-based ink jet inks suffer from deficiencies in waterfastness and lightfastness after being printed on various substrates. Pigments provide an image on a wide variety of substrates, having high optical density with high waterfastness and lightfastness. Therefore, pigments are a preferred alternative to dyes, provided the pigment dispersions can be made stable to prevent flocculation and/or aggregation and settling. Some cosolvents that can be selected as clogging inhibitors cause destabilization of pigment dispersions and, therefore, are not usually effective in pigmented inks.

There is thus a need for aqueous ink compositions and processes thereof that can be utilized in high resolution ink jet printers. Additionally, there is a need for colored, especially pigmented inks that provide high latency and also remain stable throughout the life of the ink jet cartridge. There is also a need for pigmented inks that provide high optical density in a single pass. Moreover, there is a need for ink jet inks wherein paper curl, and/or image smearing can be eliminated or minimized when such inks are selected for ink jet printing processes, and wherein the images possess minimal, or acceptable intercolor bleed, that is for example, wherein color overlap, or diffusing of one color into another is minimal, or avoided; and wherein excellent waterfastness and lightfastness images can be generated. These and other needs can be achievable with the present invention in embodiments thereof. An important need achieved with the inks and processes of the present invention is the provisions of epoxy latexes that enable inks with smear resistance, especially for inks containing surface treated carbon black colorants, and optical density enhancements.

SUMMARY OF THE INVENTION

Aspects of the present invention relate to a process for the preparation of an ink which comprises mixing an ink vehicle, a colorant and a latex containing a polymer with epoxy groups, and wherein the latex is generated by the polymerization of a mixture, for example at least about 2, of olefinic monomers, and wherein at least one of the olefinic monomers is an unsaturated epoxide monomer, and which polymerization is accomplished in the presence of an anionic surfactant, and a nonionic surfactant; a process wherein the mixture of olefinic monomers contains from about 2 to about 10 monomers; a process wherein the olefinic mixture of olefinic monomers contains from about 2 to about 5 monomers; a process wherein the olefinic monomers are comprised of an unsaturated epoxide monomer, an alkyl acrylate, and an alkyl methacrylate; a process wherein the olefinic monomers are comprised of an (1) unsaturated epoxide monomer, and (2) an alkyl acrylate, an alkyl methacrylate, a benzyl methacrylate, an acrylonitrile, a styrene functional monomer, or an acid olefinic monomer; a process wherein the mixture of olefinic monomers is comprised of an unsaturated epoxide monomer, an alkyl acrylate, an alkyl methacrylate, a benzyl methacrylate, an acrylonitrile, styrene functional monomers, or an acid olefinic monomer and wherein the unsaturated epoxide monomer is glycidyl acrylate, glycidyl methacrylate, allyl glycidyl ether or mixtures thereof present in an amount of from about 0.2 to about 15 weight percent, the ethylenically unsaturated ester is an alkyl acrylate, an alkyl methacrylate, a benzyl methacrylate, an acrylonitrile, or a styrene functional monomer present in an amount of from about 70 to about 95 percent by weight, and the olefinic acidic monomer is acrylic acid or methacrylic acid present in an amount of from about 1 to about 15 weight percent based on the total amount of monomers selected to generate the polymer; a process wherein the ink further contains ink additives, and wherein the ink additives are, for example, selected from the group consisting of biocides, humectants, polymeric additives, and stabilizing agents, and wherein the ink additives are optionally selected in an amount of from 0 to about 20 percent weight based on the total amount of components in the ink, and which total is about 100 percent, or 100 parts; a process wherein the unsaturated epoxide monomer contains an oxirane functionality and a pendant ethylenic double bond unsaturation; a process wherein the unsaturated epoxide monomer is, allyl glycidyl ether, glycidyl acrylate, or glycidyl methacrylate; a process wherein there is selected a mixture of olefinic monomers comprised of glycidyl methacrylate/butyl methacrylate/methacrylic acid, glycidyl methacrylate/benyl methacrylate/methacrylic acid, glycidyl acrylate/butyl methacrylate/methacrylic acid, allyl glycidyl ether/butyl methacrylate/methacrylic acid, and there is formed a polymer of glycidyl methacrylate/butyl methacrylate/methacrylic acid, glycidyl methacrylate/benyl methacrylate/methacrylic acid, glycidyl acrylate/butyl methacrylate/methacrylic acid, or allyl glycidyl ether/butyl methacrylate/methacrylic acid, respectively; a process wherein the mixture of monomers is comprised of an unsaturated epoxide monomer, alkyl acrylate, alkyl methacrylate, benzyl methacrylate, acrylonitrile, styrene functional monomers, or acid olefinic monomer, and the polymer formed is poly(glycidyl acrylate-butyl methacrylate-methacrylic acid), poly(glycidyl acrylate-benzyl methacrylate-methacrylic acid), poly(glycidyl methacrylate-butyl methacrylate-methacrylic acid), poly (glycidyl methacrylate-benzyl methacrylate-methacrylic acid), and poly(allyl glycidyl ether-butyl methacrylate-methacrylic acid), poly(allyl glycidyl ether-benzyl methacrylate-methacrylic acid), and wherein the epoxy latex polymer possesses a number average molecular weight $M_n$ of from about 1,000 grams per mole to about 30,000 grams per mole, and a weight average molecular weight $M_w$ thereof of from about 1,500 grams per mole to about 60,000 grams per mole; a process wherein the formed polymer glass transition temperature is from about 0 to about 60° C., and which polymer is generated from a monomer mixture; a process wherein the polymer glass transition temperature is from about 25° C. to about 50° C., and which polymer is generated from a monomer mixture; a process wherein a mixture of from about 2 to about 7 monomers is selected; a process wherein the anionic surfactant is sodium dodecyl sulfate, sodium dodecylbenzene sulfonate, sodium dodecyl naphthalene sulfate, sodium dodecyl diphenyloxide disulfonate, or sodium N-decyl diphenyloxide disulfonate; a process wherein the anionic surfactant is sodium dodecylbenzene sulfonate; a process wherein the nonionic surfactant is polyvinyl alcohol, polyacrylic acid, methyl cellulose, polyoxyethylene octylphenyl ether, or polyoxyethylene nonylphenyl ether; a process wherein the nonionic surfactant is polyoxyethylene octylphenyl ether; a process wherein the anionic surfactant is selected in an amount of from about 0.1 to about 10 weight percent based primarily on the total weight percent amount of monomers, anionic surfactant, and nonionic surfactant; a process wherein the anionic surfactant is selected in an amount of from about 0.5 to about 5 weight percent based on the total weight percent amount of monomers, ionic surfactant, and nonionic surfactant; a process wherein the nonionic surfactant is selected in an amount of from about 0.1 to about 6 weight percent based on the total weight percent amount of monomer, anionic surfactant, and nonionic surfactant; a process wherein the nonionic surfactant is selected in an amount of from about 0.5 to about 3 weight percent based on the total weight percent amount of monomers, anionic surfactant, and nonionic surfactant; a process wherein the ratio amount of anionic surfactant to nonionic surfactant is from about 1 to about –5; a process wherein the colorant is a dye; a process wherein the colorant is a pigment; a process wherein the colorant possesses a particle size distribution wherein at least about 90 percent of the pigment particles have a diameter of about 0.1 $\mu$m with the remaining pigment particles being of a diameter of about 1.0 $\mu$m; a process wherein the monomer or polymer latex contains water; a process wherein the amount of monomers selected are from about 90 to about 99, the amount of anionic surfactant is from about 0.1 to about 10, and the amount of nonionic surfactant is from about 0.1 to about 6, each based on the weight percent of the total weight percent amount of monomer, anionic surfactant, and nonionic surfactant; a process wherein the ink vehicle is selected in an amount of from about 40 to about 99 weight percent based on the total amount of components in the ink; a process wherein the vehicle is water, a glycol, or a mixture of glycols; an ink wherein the vehicle is water, a glycol, a mixture of glycols, or a mixture of water, and a miscible organic component of ethylene glycol, propylene glycol, diethylene glycols, glycerine, dipropylene glycols, polyethylene glycols, and polypropylene, and wherein the water to organic vehicle ratio is from about 100:0 to about 30:70, and preferably from about 97:3 to about 50:50; a process further containing ink additives of surfactants of poly(ethylene glycol) monolaurate, poly(ethylene glycol) monoricinoleate, poly(ethylene glycol) lanolin alcohol ether, poly(ethylene glycol) monooleate, poly(ethylene glycol) castor oil, poly (ethylene glycol) tetramethyl decynediol, or poly(ethylene glycol) lanolin, and which surfactants are present in an amount of from about 0.01 to about 7 weight percent or parts based on the total amount of ink components and which total is about 100 percent; a process further containing ink additives of a biocide, a humectant, or mixtures thereof, and wherein the biocide is present in an amount of from about 0.1 to about 10 percent by weight, and the humectant is present in an amount of from about 0.1 to about 50 percent by weight based primarily on the total amount of components in the ink; a high resolution printing process wherein high is from about 300 to about 1,000 dots per inch comprising applying in imagewise fashion to a substrate an ink composition illustrated herein; a process wherein the substrate is paper, and there is selected a printer having at least one nozzle of a channel width or diameter ranging from about 10 to about 40 microns and intercolor bleed is minimized or eliminated, and wherein the printing process is optionally accomplished with a 600 spi ink jet printer with a radiant heat assisting drying process; a process for reducing or eliminating paper curl and avoiding or minimizing smear in a xerographic ink jet apparatus which comprises generating images in the apparatus and developing the images with the ink compositions illustrated herein; a process wherein subsequent to polymerization at a temperature of from about 20° C. to about 100° C., there is formed an epoxy containing polymer of (poly(glycidyl methacrylate-butyl methacrylate-methacrylic acid), poly(glycidyl acrylate-butyl methacrylate-methacrylic acid), poly(allyl glycidyl ether-butyl methacrylate-methacrylic acid); wherein the epoxy polymer in the polymer emulsion is comprised of from about 0.05 to about 10 weight percent of epoxy groups based on the epoxy polymer; the epoxy latex polymer possesses a number average molecular weight $M_n$ of from about 500 to about 50,000, and a weight average molecular weight $M_w$ of from about 1,000 to about 80,000; a process wherein the polymer formed is selected from the group consisting of poly(glycidyl methacrylate-butyl methacrylate-acrylic acid), poly(glycidyl methacrylate-benzyl methacrylate-acrylic acid), poly(glycidyl methacrylate-butyl acrylate-acrylic acid), poly(glycidyl acrylate-butyl methacrylate-acrylic acid), poly(glycidyl acrylate-benzyl methacrylate-acrylic acid), poly(glycidyl acrylate-butyl acrylate-acrylic acid), poly(glycidyl methacrylate-butyl methacrylate-methacrylic acid), poly (glycidyl methacrylate-benzyl methacrylate-methacrylic acid), poly(glycidyl methacrylate-butyl acrylate-methacrylic acid), poly(glycidyl acrylate-butyl methacrylate-methacrylic acid), poly(glycidyl acrylate-benzyl methacrylate-methacrylic acid), poly(glycidyl acrylate-butyl acrylate-methacrylic acid), poly(allyl glycidyl ether-butyl methacrylate-acrylic acid), poly(allyl glycidyl ether-benzyl methacrylate-acrylic acid), poly(allyl glycidyl ether-butyl acrylate-acrylic acid), poly(allyl glycidyl ether-styrene-methacrylic acid), poly(allyl glycidyl ether-butyl methacrylate-methacrylic acid), poly(allyl glycidyl ether-benzyl methacrylate-methacrylic acid), poly(allyl glycidyl ether-butyl acrylate-methacrylic acid), poly(glycidyl acrylate-acrylonitrile-methacrylic acid), poly(glycidyl methacrylate-acrylonitrile-acrylic acid), poly(glycidyl acrylate-acrylonitrile-methacrylic acid), and poly(glycidyl methacrylate-acrylonitrile-methacrylic acid); a process wherein the ink additives are present in an amount of from about 0.01 to about 7 percent by weight; a process wherein the $M_n$ is preferably from about 1,000 to about 30,000 grams per mole, and the $M_w$ is preferably from about 1,500 to about 60,000 grams per mole; a process which comprises generating a polymer latex by the polymerization of a mixture of monomers wherein at least one of the monomers is an unsaturated epoxide monomer; a process wherein the polymerization is accomplished in the presence of an anionic surfactant and a nonionic surfactant; a process wherein prior to the polymerization there is added a colorant and an ink vehicle; and ink compositions comprised of colorant, polymer, and certain additives, and wherein the inks are comprised of a major amount of a vehicle like water, colorant, such as dye, pigment, or mixtures thereof, epoxy containing polymer, and known ink additives, such as biocides, humectants, polymeric additives, stabilizer additives, and the like.

The liquid ink vehicle is generally present in an amount of from about 50 to about 99 percent by weight, the colorant is generally present in an amount of from about 1 to about 20 percent by weight, the epoxy latex polymer, or resin is generally present in an amount of from about 0.05 to about 20 percent by weight; ink additives of a biocide is generally present in an amount of from about 0 to about 10 percent by weight, humectant generally present in an amount of from about 0 to about 50 percent by weight, polymeric additive is generally present in an amount of from about 0 to about 10 percent by weight, stabilizer additive is generally present in an amount of from about 0 to about 5 percent by weight, based on the total amount of components in the ink. The inks in embodiments are smear resistant or possess reduced smear (an advantage smear reduction is in productivity of the output of prints can be increased, and image quality increased). Also, when image smear is reduced, the page to page contact is unaffected by smeared images on the backside of pages. Other advantages of reduced image smear are less of the image is removed on users, and less transfer when a highlighter pen is drawn across the image, or when liquids are spilled and wiped up as ink latency of at least about 10 seconds in a printer having at least one nozzle of a channel width or diameter ranging, for example, from about 10 to about 40 microns, and wherein intercolor bleed is minimized or eliminated.

The inks of the present invention are prepared by the formation of an epoxy polymer containing latex, and more specifically wherein there are generated polymer latexes containing epoxy groups, and wherein the epoxy groups may function as a crosslinking site with carboxyl functionalities on carbon black colorant or other color pigment surfaces to thereby, for example, impart to the inks formed smear resistance, film hardness, and humidity resistance. The latex generated can then been subjected to aggregation and fusing with a colorant, as illustrated in the Xerox United States patents recited herein.

More specifically, the present invention comprises the generation, preferably by emulsion polymerization, of a latex containing an epoxy polymer as follows:

The epoxy latex polymer can be initially prepared by a free radical-initiated aqueous emulsion polymerization of a mixture of unsaturated epoxide monomers and ethylenically unsaturated monomers by heating at, for example, temperatures of between about 45° C. to about 90° C., wherein the resulting epoxy latex polymer possesses, for example, a number average molecular weight of from about 1,000 grams per mole to about 30,000 grams per mole, and a weight average molecular weight of from about 1,500 grams per mole to about 60,000 grams per mole, and a glass temperature of from about zero to about 60° C. The epoxide group is sufficiently stable to hydrolysis to enable its incorporation into the polymer latex. Internal crosslinking, that is the gel content is from about 5 to about 60 weight percent of the epoxy latex copolymer can be prevented or reduced by controlling the molecular weight by means of a chain transfer agent. (The determination of percent total gel is a gravimetric filtration technique. Air-dried epoxy copolymer sample dissolution in toluene is followed by a vacuum filtration. The collecting membrane is dried and weighed for percent gel retained.) The epoxy polymer emulsion is preferably comprised of from about 1 to about 40 weight percent of polymer particles, wherein the epoxy polymer in the polymer emulsion is comprised of from about 0.05 to about 10 weight percent of epoxy groups based on the epoxy polymer, of average diameter of from about 30 nanometers to about 300 nanometers. The unsaturated epoxide monomers characteristically contain oxirane functionality and pendant ethylenic double bond unsaturation and such monomers include, for example, acrylic, methacrylic, or vinyl derivatives of glycidol. Preferred unsaturated epoxide monomers containing pendant oxirane groups include allyl glycidyl ether, glycidyl acrylate, glycidyl methacrylate, 1,2-dimethyl-3-vinyl-2-propyl glycidyl ether, glycidyl methyl itaconate, glycidyl vinylcarbamate, glycidyl 2,4-hexadienoate, glycidyl ethylenesulfonate, glycidyl 2-propylene-1-sulfonate, 3,4-epoxy-2-methyl-1-butene, glycidyl 4-vinylbenzoate, 4-vinylphenyloxirane, allyl 2,3-epoxypropyl ether, allyl 2,3-epoxypropyl phthalate, divinylbenzene monoepoxide, 2,3-epoxypropyl methacrylate, 4-vinylphenyl glycidyl ether, vinyl 10,11-epoxyundecanoate, or mixture thereof. Particularly preferred unsaturated epoxide monomers are glycidyl acrylate, glycidyl methacrylate, and allyl glycidyl ether and their mixture thereof. The unsaturated epoxide monomers can be copolymerized with ethylenically unsaturated monomers which include, for example, vinyl aromatic and aliphatic hydrocarbons such as styrene, a-methyl styrene and similar substituted styrenes, vinyl naphthalene, vinyl toluene, divinyl benzene, and vinyl aliphatic hydrocarbons such as 1,3-butadiene, methyl-2-butadiene, 2,3-dimethyl butadiene, cyclopentadiene and dicyclopentadiene as well as ethylenically unsaturated esters such as acrylic, methacrylic, cinnamic and crotonic and the like and esters containing fumaric and maleic type unsaturation, and acid olefinic monomers such as acrylic acid, methacrylic acid, itaconic acid, fumaric acid, maleic acid, sodium acrylate, potassium acrylate, and the like. Particularly preferred monomers include, for example, styrene, 1,3-butadiene, isoprene, alkyl (meth)acrylates such as ethyl acrylate, butyl acrylate, methyl methacrylate, butyl methacrylate, acrylonitrile, vinyl acetate, acrylic acid, and methacrylic acid.

Generally, the unsaturated epoxide monomer amount utilized, such as glycidyl acrylate, glycidyl methacrylate, allyl glycidyl ether or mixtures thereof is from about 0.2 to about 15 weight percent of the epoxy copolymer resin of, for example, poly(glycidyl methacrylate-butyl methacrylate-methacrylic acid); the ethylenically unsaturated ester or styrene functional monomer amount utilized is, for example, from about 70 to about 95 percent by weight, and the olefinic acidic monomers amount utilized, such as acrylic acid or methacrylic acid, for example, is from about 1 to about 15 weight percent of the resins.

The free radical initiator utilized is generally an emulsion type initiator, such as a persulfate like potassium or ammonium persulfate, and chain transfer agents can be selected to adjust the molecular weight of the epoxy copolymer, such as the poly(glycidyl methacrylate-butyl methacrylate-methacrylic acid) resin and for adjusting the resin particle to solubilized resin ratio. Chain transfer agents selected include alkylthiol such as dodecanethiol, for example, about 0.1 to about 10 percent by weight, halogenated carbons such as carbon tetrabromide, for example, about 0.1 to about 10 percent by weight, based on the monomer, or monomers used to prepare the epoxy copolymer resin, or a mixture of an alkylthiol and a halogenated carbon. Surfactants can also be incorporated into the resin emulsion such as anionic, cationic and nonionic surfactants, wherein the effective amount of anionic surfactant is, for example, from about 0.1 to about 10 percent by weight, the effective amount of nonionic surfactant is from about 0.1 to about 6 weight percent, the effective amount of cationic surfactant is, for example, from about 0.1 to about 5 percent by weight based on the monomer, or monomers used to prepare the epoxy copolymer resin.

In one specific embodiment, the resin emulsion is prepared by charging a half liter kettle equipped with a mechanical stirrer with from about 300 to about 320 grams of water, 1.0 to about 3 grams of sodium dodecylbenzene sulfonate, available from Aldrich, and from about 1.5 to about 2.5 grams of Triton X-100 (alkylphenoxypolyethanol) available from Union Carbide. This mixture is then stirred for about 0.5 hour at about 100 to about 200 revolutions per minute. To this solution is then added about 1.5 to about 2.5 grams of ammonium persulfate, followed by the addition of an organic mixture containing from about 4 to about 12 grams of glycidyl methacrylate, about 60 to about 75 grams of butyl methacrylate, about 1 to about 8 grams of methacrylic acid, about 0 to about 6 grams of dodecanethiol, and from about 0 to about 5 grams of carbon tetrabromide. The mixture is then heated to about 70° C. to 80° C. (Centigrade) for a duration of, for example, from about 3 to about 16 hours. The polymer product is then cooled to room temperature, about 25° C., and a sample (about 10 grams) is freeze dried and analyzed by GPC with a resin, a number average molecular of about 5,000 to about 90,000, a weight average molecular weight of about 2,000 to about 100,000 grams per mole and a polydispersity of about 2.0 to about 5; and analyzed by DSC with a resin, the glass temperature thereof is from about 20 to about 60° C.

Embodiments of the present invention include an ink comprised of a vehicle, colorant, and epoxy resin emulsion, and wherein the epoxy resin emulsion contains water, surfactant, resin particles obtained from the illustrated herein emulsion polymerization of a mixture of olefinic monomers, and wherein at least one of the olefinic monomers is an unsaturated epoxide monomer, and more specifically, are ethylenically unsaturated esters, styrene functional monomers, olefinic acidic monomers, or mixtures thereof.

Moreover, the inks can contain penetrants of N-methylpyrrolidinone, sulfoxides, ketones, lactones, esters, alcohols, butyl carbitol, benzyl alcohol, cyclohexylpyrrolidinone, 2-pyrolidone, and 1,2-hexanediol present in an amount of, for example, from about 0.01 percent to 30 percent by weight.

The present invention also relates to a high resolution printing process comprising applying in imagewise fashion to a substrate the invention ink in a printer having at least one nozzle of a channel width or diameter ranging from about 10 to about 40 microns and intercolor bleed is minimized or eliminated, and wherein the printing process is optionally accomplished with a 600 spi ink jet printer with a radiant heat assisting drying process; a printing process which comprises incorporating into an acoustic ink jet printer the invention ink with a viscosity of from about 0.7 to about 5 centipoise at a temperature of from about 25° C. to about 50° C., and causing droplets of the ink to be ejected in imagewise pattern onto a substrate; a process which comprises (a) providing a acoustic ink printer having a pool of liquid ink with a free surface, and a printhead including at least one droplet ejector for radiating the free surface of the ink with focused acoustic radiation to eject individual droplets of ink therefrom on demand, the radiation being brought to focus with a finite waist diameter in a focal plane, and which ink possesses a viscosity of from about 0.7 to about 5 centipoise at a temperature of from about 25° C. to about 50° C., and (b) causing droplets of the ink to be ejected onto a recording sheet in an imagewise pattern at a temperature of from about 20° C. to about 50° C.; an imaging process which comprises the development of an image with an aqueous ink jet ink composition comprised of colorant, such as dye or pigment, water, and additives as indicated herein, and wherein images with acceptable, or low intercolor bleed, photo like quality, waterfastness, for example from about 90 to about 99 percent, and minimal curling and minimal smearing are obtained; and a high resolution printing process comprising applying in imagewise fashion to a substrate in a printer having at least one nozzle of a channel width or diameter ranging from about 10 to about 40 microns. Also, the inks and imaging processes of the present invention in embodiments thereof can possess numerous advantages including excellent ink waterfastness, lightfastness, low product cost, high image resolution, excellent print quality on a variety of substrates, excellent jetting capability with high drop velocity, longer latency, larger drop mass or drop volume which provides optimal optical density in a single pass, high frequency response which allows for high speed printing, excellent printhead recoverability and maintainability, excellent ink stability, minimal ink and pigment settling, a lack of printhead kogation, and more importantly, wherein the inks when selected for ink jet processes enable photo like quality, and low intercolor bleed, on substrates such as paper.

Examples of vehicles selected for the inks include water, glycols, mixtures of glycols, a mixture of water and a miscible organic component, such as a glycol, such as ethylene glycol, propylene glycol, diethylene glycols, glycerine, dipropylene glycols, polyethylene glycols, polypropylene glycols and the like, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof. The liquid vehicle is generally present in an amount of from about 50 to about 99 and preferably about 98.9 percent by weight, based on total amount of components in the ink, and more preferably from about 55 to about 95 percent by weight, and still more preferably from about 60 to about 90 percent by weight, although the amounts may be outside these ranges in embodiments. The total of all ink components is about 100 percent, or 100 parts. Also, there can be selected other vehicles not specifically recited herein.

When mixtures of water and water miscible organic liquids are selected as the liquid vehicle, the water to organic ratio may be in any effective range, and typically is from about 100:0 to about 30:70, and preferably from about 97:3 to about 50:50, although the ratio can be outside these ranges. The nonwater component of the liquid vehicle generally functions as a humectant and possesses a boiling point higher than that of water (100° C.). The colorant, such as a pigment dispersion can be mixed with different humectants or solvents including ethyleneglycol, diethyleneglycol, propyleneglycol, dipropylene glycol, polyethyleneglycols, polypropylene glycols, glycerine, trimethylolpropane, 1,5 pentanediol, 1,6 hexanediol, diols and triols containing 2 to 10 carbons, sulfoxides, for example dimethylsulfoxide, alkylphenyl sulfoxides or sulfones like sulfolane, dialkyl sulfones, alkyl phenyl sulfones, and the like, amides, for example N,N-dialkyl amides, N,N-alkyl phenyl amides, 3-methyl-2-oxazolidinone, isosorbide dimethyl ether, 2-pyrrolidinone, N-methylpyrrolidinone, N-cyclohexylpyrrolidinone, N,N-diethyltoluamide, and the like, ethers such as alkyl ether derivatives of alcohol, etherdiols, and ether triols including butylcarbitol, alkyl polyethyleneglycols, and the like, urea, betaine, or the thio (sulfur) derivatives of the aforementioned materials, for example, thioethyleneglycol, trithioethyleneglycol, and the like. Known desired penetrants, water soluble polymers, surfactants, pH buffer, biocides, chelating agents (EDTA and the like), and optional additives can also be selected for the inks.

Polymer latex examples, and which polymers are generated from the polymerization of monomers, include known epoxy polymers such as poly(glycidyl methacrylate-styrene-acrylic acid), poly(glycidyl methacrylate-ethyl methacrylate-acrylic acid), poly(glycidyl methacrylate-butyl methacrylate-acrylic acid), poly( glycidyl methacrylate-benzyl methacrylate-acrylic acid), poly( glycidyl methacrylate-methyl acrylate-acrylic acid), poly (glycidyl methacrylate-ethyl acrylate-acrylic acid), poly (glycidyl methacrylate-butyl acrylate-acrylic acid), poly (glycidyl acrylate-styrene-acrylic acid), poly(glycidyl acrylate-ethyl methacrylate-acrylic acid), poly(glycidyl acrylate-butyl methacrylate-acrylic acid), poly(glycidyl acrylate-benzyl methacrylate-acrylic acid), poly(glycidyl acrylate-methyl acrylate-acrylic acid), poly(glycidyl acrylate-ethyl acrylate-acrylic acid), poly(glycidyl acrylate-butyl acrylate-acrylic acid), poly(glycidyl methacrylate-styrene-methacrylic acid), poly(glycidyl methacrylate-ethyl methacrylate-methacrylic acid), poly(glycidyl methacrylate-butyl methacrylate-methacrylic acid), poly(glycidyl methacrylate-benzyl methacrylate-methacrylic acid), poly (glycidyl methacrylate-methyl acrylate-methacrylic acid), poly(glycidyl methacrylate-propyl acrylate-methacrylic acid), poly(glycidyl methacrylate-butyl acrylate-methacrylic acid), poly(glycidyl acrylate-styrene-methacrylic acid), poly(glycidyl acrylate-methylstyrene-methacrylic acid), poly(glycidyl acrylate-methyl methacrylate-acrylic acid), poly(glycidyl acrylate-ethyl methacrylate-methacrylic acid), poly(glycidyl acrylate-butyl methacrylate-methacrylic acid), poly(glycidyl acrylate-benzyl methacrylate-methacrylic acid), poly (glycidyl acrylate-methyl acrylate-methacrylic acid), poly (glycidyl acrylate-ethyl acrylate-acrylic acid), poly(glycidyl acrylate-butyl acrylate-methacrylic acid), poly(allyl glycidyl ether-styrene-acrylic acid), poly(allyl glycidyl ether-methyl methacrylate-acrylic acid), poly(allyl glycidyl ether-ethyl methacrylate-acrylic acid), poly(allyl glycidyl ether-butyl methacrylate-acrylic acid), poly(allyl glycidyl ether-benzyl methacrylate-acrylic acid), poly(allyl glycidyl ether-butyl acrylate-acrylic acid), poly(allyl glycidyl ether-styrene-methacrylic acid), poly(allyl glycidyl ether-ethyl methacrylate-methacrylic acid), poly(allyl glycidyl ether-butyl methacrylate-methacrylic acid), poly(allyl glycidyl ether-benzyl methacrylate-methacrylic acid), poly(allyl glycidyl ether-butyl acrylate-methacrylic acid), poly(glycidyl acrylate-acrylonitrile-methacrylic acid), poly(glycidyl methacrylate-acrylonitrile-acrylic acid), poly(glycidyl acrylate-acrylonitrile-methacrylic acid), poly(glycidyl methacrylate-acrylonitrile-methacrylic acid) and preferably, poly(glycidyl methacrylate-butyl methacrylate-acrylic acid), poly(glycidyl methacrylate-benzyl methacrylate-acrylic acid), poly(glycidyl methacrylate-butyl methacrylate-methacrylic acid), poly(glycidyl methacrylate-benzyl methacrylate-methacrylic acid), poly(allyl glycidyl ether-butyl methacrylate-methacrylic acid), poly(allyl glycidyl ether-benzyl methacrylate-methacrylic acid), and the like. The latex polymer, or resin is generally present in various suitable amounts, such as from about 0.05 to about 20, and preferably from about 0.10 to about 10 weight percent of the ink, and the latex size can be, for example, from about 0.01 micron to about 1 micron, and preferably from about 0.05 micron to about 0.5 micron in volume average diameter as measured by Coulter Counter nanosize particle analyzer.

The colorant for the ink compositions of the present invention includes a dye, pigment, mixtures of dye and pigment, mixture of dyes, a mixture of one or more pigments, and the like. The colorant can be black, cyan, magenta, yellow, red, blue, green, orange, brown, mixtures thereof, and the like, and is preferably carbon black, such as Levanyl carbon black obtained from Bayer. Examples of suitable black pigments include various carbon blacks such as channel black, furnace black, lamp black, and the like. Colored pigments, or dyes include red, green, blue, brown, magenta, cyan, yellow, and mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. The preferable pigment dispersions include carbon blacks, such as Hostafine Black (T and TS), Sunsperse 9303, Cabot CSC-440L, Cabot IJX56, Cabojet 300 by Cabot corporation and other Cabot products, Bonjet Pigment products and Levanyl Black A-SF. Of these, Levanyl Black A-SF Cabot CSX-440L, and Cabot IJX56 are the most preferred. Examples of suitable colorants, especially pigments that may be selected in embodiments are illustrated in U.S. Pat. No. 5,556,727, the disclosure of which is totally incorporated herein by reference.

Examples of suitable dyes include reactive dyes, direct dyes, anionic dyes, acid dyes, food dyes, and the like. Specific examples of suitable dyes include the ProJet dyes available from Zeneca (ICI) such as ProJet Yellow 1G, ProJet Yellow OAM, and ProJet Fast Yellow 2, ProJet Cyan 1, ProJet Fast Cyan 2, ProJet Magenta 3B-OA, ProJet Magenta 1T, ProJet Magenta 1, ProJet Fast Magenta 2, ProJet Fast Black 2. Other dyes are also suitable for the embodiments of this invention: Basacid Black X-34, available from BASF, Carta Black 2GT, available from Sandoz Inc., Duasyn Acid Blue AE-SF, available from Hoechst, Duasyn Direct Turquoise Blue FRL-SF available from Hoechst, Duasyn Yellow R-GL, available from Hoechst, Bayscript Yellow GGN, available from Bayer, Pontamine Brilliant Flavine 6G-N, available from Bayer, Bayscript Magenta WDP, available from Bayer, Duasyn Acid Rhodamine B-SF, available from Hoechst, Bayscript Yellow BR, available from Bayer, Bayscript Cyan BA Liquid, available from Bayer, Special Black HF Liquid, available from Bayer, Special Yellow CA51089FW, available from Bayer, Acid Yellow 17, available from Tricon.

Preferably, the colorant, especially pigment particle size is small to enable a stable colloidal suspension of the particles in the liquid vehicle and to prevent clogging of the ink channels when the ink is used in a thermal ink jet printer. Preferred colorant particle average diameters are generally from about 0.001 to about 2 microns, and more preferably from about 0.01 to about 1 micron in volume average diameter, although the particle size can be outside these ranges. A more preferred pigment particle size includes particles having at least 70 percent of the particles being below about 2 microns with no particles being greater than 1.0 micron (measured on a Hodaka CAPA 700 Particle Size Analyzer). More preferably, the pigment particle size includes particles having at least 90 percent of the particles being below 0.1 micron with no particles being greater than about 1.0 micron.

The colorant is present in the ink composition in various effective amounts and generally from about 1 to about 20 percent by weight, preferably from about 2 to about 10 percent by weight, more preferably from about 3 to about 9 percent by weight, and most preferably from about 4 to about 8 percent, although the amounts can be outside of these ranges.

Latex anionic surfactants include sodium dodecylsulfate (SDS), sodium dodecylbenzene sulfonate, sodium dodecylnaphthalene sulfate, sodium diphenyloxide disulfonates, dialkyl benzenealkyl, sulfates and sulfonates, abitic acid, available from Aldrich, NEOGEN R™, NEOGEN SC™ obtained from Kao, and the like. Examples of cationic surfactants are dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like selected in effective amounts of, for example, from about 0.01 percent to about 10 percent by weight of the monomers used to prepare the polymer latex. Examples of latex anionic surfactants are sodium dodecylbenzene sulfonate, sodium dodecyinaphthalene sulfate, sodium diphenyloxide disulfonates, dialkyl benzenealkyl, sulfates and sulfonates, abitic acid, available from Aldrich, NEOGEN R™, NEOGEN SC™ obtained from Kao, and the like, and examples of nonionic surfactants are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™, available from Union Carbide as TRITON X-100™, TRITON X-405™, TRITON X-705™, and hydrolyzable or cleavable nonionic surfactants of the formulas illustrated in U.S. Pat. No. 08/960,754, the disclosure of which is totally incorporated herein by reference, such as poly(ethylene glycol) methyl p-tert-octylphenyl phosphate, wherein the surfactant contains, for example, 40 ethylene glycol units, poly(ethylene glycol)-α-methyl ether-ω-methyl p-tert-octylphenyl phosphate (wherein the surfactant contains 17 ethylene glycol units). These surfactants are utilized in various effective amounts, such as for example from about 0.1 to about 10 percent, and from 1 to about 5 weight percent by weight of the monomers used to prepare the polymer latex.

Polymeric additives can also be added to the inks for example, to enhance the viscosity of the ink, include water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines derivatized with polyethylene oxide and polypropylene oxide, such as the DISCOLE® series available from DKS International, Tokyo, Japan, the JEFFAMINE® series available from Texaco, Bellaire, Tex., and the like. The polymeric additives may be present in the ink of the present invention in amounts of, for example, from 0 to about 10 percent by weight, preferably from about 0.001 to about 8 percent by weight, and more preferably from about 0.01 to about 5 percent by weight, although the amount can be outside these ranges. Preferred polymeric additives are described in copending application U.S. Ser. No. 536,236, the disclosure of which is totally incorporated herein by reference, which additives are especially useful as pigment like carbon black stabilizers. The self-emulsifying sulfolated polyesters disclosed in U.S. Ser. No. 536,236 can be selected as additives in various appropriate amounts and preferably in amounts of from about 0.1 weight percent to about 12 weight percent and more preferably from about 1 weight percent to about 8 weight percent. The preferred polyesters have a glass transition temperature ranging from about 0° C. to about 80° C. and preferably between about 20° C. and about 65° C. One selected polyester is a sulfonated polyester with about 7.5 percent sulfonation, weight average molecular weight of about 2,080, $M_n$ of about 1,043, Tg of about 54.9° C., and softening point of about 135° C.

Examples of specific optional ink additives that may be selected include biocides, such as DOWICIL® 150 (o-phenylphenol), 200 (Quaternium-15), and 75 (1-(3-chloroallyl)-3,5,7-triaza-1-azoniaadamantane chloride), benzoate salts, sorbate salts, 1,2-benzisothiazolinone also known as Proxel GXL products obtained from Zeneca Chemicals and the like, present in an amount of from 0 to about 10 percent by weight, preferably from about 0.001 to about 8 percent by weight, and more preferably from about 0.01 to about 4.0 percent by weight, although the amounts can be outside these ranges; penetration control additives, such as N-methylpyrrolidinone, 2-pyrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 1 to about 30 percent by weight, although the amounts can be outside these ranges; pH controlling agents, such as acids or bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges; and penetrants, as illustrated herein, such as butyl carbitol, and cyclohexylpyrrolidinone in amounts for example of from about 0.1 to about 20 percent by weight and preferably from about 0.5 to about 10 percent by weight, and the like.

Examples of suitable ink additives include those as illustrated in U.S. Pat. No. 5,223,026 and U.S. Pat. No. 5,207,825, the disclosures of each patent being totally incorporated herein by reference. Examples of these additives include alcohol surfactants, and more specifically, a mixture of secondary alcohols reacted with ethylene oxide, such Tergitol 15-S series surfactants available from Union Carbide, polyethylene oxide, alkylphenoxypolyethylene oxide, such as Triton X-100, available from Aldrich Chemical Company, polyethylene oxide nonylphenyl ether, available as IGEPAL from Aldrich Chemical Company, or as ANTAROX from Rhone Poulenc. The surfactants may be selected in various effective amounts, such as for example from about 0 to about 5 percent, and from 1 to about 3 weight percent by weight of the ink.

The ink compositions of the present invention possess in embodiments surface tensions of, for example, greater than about 25 dynes/cm$^2$, preferably greater than about 30 dynes/cm$^2$ and more preferably greater than about 40, such as from about 40 to about 100 a viscosity of, for example, less than about 10 cps, preferably less than about 8 cps, and more preferably less than about 5 cps, such as from about 1 to about 5 cps. The surface tension can be measured with a Kruss Model K10 tensiometer, and the viscosity can be determined at about 25° C. by a Brookfield Fluid Rheometer.

The inks of the present invention possess, it is believed, superior ink stability, for example they maintain a substantially constant viscosity as measured by a Brookfield Fluid Rheometer, a suitable pH as measured by a pH electrode and meter, and an effective surface tension as measured by a fluid tensiometer. Moreover, the inks do not exhibit or possess minimal visible pigment or emulsion particle settling behavior for extended time periods, for example over six months, and more specifically, from about six months to about two years.

In embodiments, the substantially constant viscosity, pH, surface tension, and lack of particulate settling is maintained despite stressing the ink by, for example, permitting the ink to remain in a bottle at room temperature, for example about 25° C., then subjecting the ink to heating at about 60° C. (degrees Centigrade) for 24 hours or 50° C. for 30 days; or subjecting the ink to freezing at −30° C. followed by thawing at room temperature. Under these stress conditions, the viscosity of the ink does not substantially increase or decrease more than about 0.5 cPs (centipoise). A substantial viscosity change, for example from 3 centipoise (cPs) to about 4 centipoise, may cause the ink to be nonjettable, and/or may render the ink incapable of passing through the jetting device filter. An adverse change in ink viscosity may result in the lack of refilling ink being provided to the jetting device, and thus subsequent loss of jetting channel refill and drops not being fired from the jetting device. Subjecting the inks to temperatures below about 0 degrees Celsius, such as −40° C., and thereafter thawing the inks, an extreme condition which may occur during transportation of the ink in winter, or cold climates, evidenced no visible ink settling or precipitate of the ink, such as the pigment, the resin emulsion particles, and pigment with other ink components. Visible settling or precipitates, after the ink has remained at 25° C., would cause ink jet nozzle clogging, and therefore, effect the line edge raggedness, optical density, or mottle of the images. Also, the settling of the ink would permit a nonhomogeneous mixture which may also cause storage problems such as in an ink tank containing a wicking device. Further, the inks of the present invention can be free of additional special additives, such as the prior art saccharine/polyols, which are selected for long shelf stability or excellent jetting performance.

The inks of the present invention in embodiments possess excellent latency. Generally, the inks possess a functional latency of at least 10 seconds, more generally on the order of 20 seconds to greater than 1,000 seconds, with a minimum latency of at least about 30 seconds being preferred.

Moreover, the inks of the present invention in embodiments possess excellent dry and wet smear resistance, that is for example a dry smear optical density of at least less than about 0.10, and more specifically, a dry smear optical density of from about 0 to about 0.07. A toner smear optical density results in less transfer of ink on the developed image onto other media, or users. The OD smear is a measure of the amount of ink or image removed as compared to a print image of the same ink without the epoxy polymer latex. Generally, the image of the inks comprised of an epoxy latex possess a wet smear optical density of at least less than 0.20, more generally a wet smear optical density of less than 0.10, preferably from about 0 to about 0.10 as compared with a print image of ink without epoxy polymer latex which possesses a wet smear optical density of greater than, typically from about 0.20 to about 0.30.

The ink may be applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, Xerox Color Expressions, or the like, coated papers, such as those available from Jujo, transparency materials suitable for aqueous inks or ink jet printing processes, or the like.

The following Examples and Comparative Examples are provided.

EVALUATIONS

The properties of the following prepared ink compositions were evaluated as follows:

A) Physical Properties:

The viscosity of the ink was measured at 25° C. using a Brookfield Model DV-11 viscometer.

The surface tension of the ink was measured at 25° C. using a Kruss model K10T plate tensiometer.

The pH was measured at 25° C. using a Corning model 345 pH meter.

B) Dry Smear Resistance:

The inks were placed in an ink jet printer HP850C (Hewlett Packard). After an image was printed, the image was allowed to stand, or remain at room temperature, about 25° C. throughout, for 24 hours prior to evaluation. The optical density of the solid area was measured prior to smear testing using a densitometer (X-Rite 428). The images were printed on several media such as Xerox Courtland 4024DP and Image Series LX paper. A clean sheet of the matching paper was placed on top of the solid area image. Using a rub tester (Manufactured by Testing Machines Inc.), a 4 pound weight was placed on top of the covered image. At a speed of 85 rubs per minute, the image was subjected to 50 rubs at 25° C. and 50 percent RH. The area adjacent to the solid area image was measured using the densitometer.

C) Wet Smear Resistance:

The inks were placed in an ink jet printer HP850C (Hewlett Packard).

After an image was printed the image was allowed to stand, or remain at room temperature for 24 hours prior to evaluation. The optical density of the solid area was measured prior to smear testing using a densitometer (X-Rite 428). The images were printed on several media such as Xerox Courtland 4024DP and Image Series LX paper. An inhouse micro wet smear test fixture was used to smear the image with the use of water wetted chisel tips (similar to highlighter felt tips). The saturated tips was assembled into a mechanical pen. The mechanical pen equipped with the wetted tip was traversed across the image at a force of about 80 to about 100 grams. This procedure was repeated three times across unsmeared regions of the image. The optical density of the area between the printed lines was measured and averaged over at least ten measurements. The optical density of the background of the media was subtracted from the optical density adjacent to the image.

D) Stability:

50 Grams of ink were placed in a capped bottle and allowed to stand at a temperature of 60° C. for 24 hours. The ink physical properties were measured after heat treatment. For comparison, the shelf standing ink was also measured for physical properties. Large changes greater than 0.3 centipoise units for viscosity indicated instability. Other physical properties, such as surface tension or pH, were monitored, and changes of 3 dynes/cm or a change in pH by more than about 0.5 would indicate instability. Observation of the ink standing on the shelf at room temperature, about 25° C. throughout, for settling was also tested.

E) Optical Density:

An image was printed by an ink jet printer HP855C on each of the following papers: Xerox Courtland 4024DP and Images Series LX. The optical density of the printed image was measured by an X-Rite densitometer.

The ink may be applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox series 10 paper, Xerox 4024 paper, or the like, coated papers, such as those available from Jujo, transparency materials suitable for aqueous inks or ink jet printing processes, or the like.

EXAMPLE I

An epoxy latex emulsion comprised of polymer particles derived from emulsion polymerization of glycidyl methacrylate, butyl methacrylate, methacrylic acid, 10/84/6 parts (by weight), was prepared as follows.

In a 500 milliliter jacketed glass flask equipped with a mechanical stirrer, 1.2 grams of ammonium persulfate, 2 grams of sodium dodecylbenzene sulfonate obtained from Aldrich, 2 grams of Triton X-100 (alkylphenoxypolyethanol) available from Union Carbide, and 320 grams of deionized water were deaerated for 30 minutes. A monomer mixture of 8 grams of glycidyl methacrylate, 67.2 grams of butyl methacrylate, and 4.8 grams of methacrylic acid, and 1.6 grams of dodecanethiol and 1.6 grams of carbon tetrabromide was charged into the flask and the resulting mixture was emulsified for 10 minutes at room temperature, about 25° C. throughout. This emulsion was then polymerized at 70° C. for 5.5 hours in a nitrogen atmosphere. The resulting latex polymer, poly (glycidyl methacrylate-butyl methacrylate-methacrylic acid), after cooling throughout possessed an weight average molecular weight $M_w$ of 36,000, an a number average molecular weight $M_n$ of 11,600, as determined on a Waters GPC, and a glass transition temperature of 38° C., as measured on a Seiko DSC. The latex polymer, or latex resin possessed a volume average diameter for the polymer of 145 nanometers as measured by light scattering technique on a Coulter N4 Plus Particle Sizer. The resin emulsion product was comprised of 21.2 percent by weight of poly(glycidyl methacrylate-butyl methacrylate-methacrylic acid) resin, 0.5 percent by weight of sodium dodecylbenzene sulfonate, 0.5 percent by weight Triton X-100 (alkylphenoxypolyethanol), and 77.8 percent by weight of water.

EXAMPLE IA

An ink comprised of 4 percent by weight of CABOT IJX56 carbon black obtained from Cabot Corporation, 23.2 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 5 percent by weight of the emulsion derived from Example I (the emulsion was comprised of 21.2 percent by weight of poly(glycidyl methacrylate-butyl methacrylate-methacrylic acid) resin, 0.5 percent by weight of sodium dodecylbenzene sulfonate, 0.5 percent by weight Triton X-100 (alkylphenoxypolyethanol), and 77.8 percent by weight of water) was prepared by dissolution of the polyethyleneoxide in water through simple agitation using a stir bar for about 5 minutes, followed by the addition of sulfolane, 2-pyrrolidinone and the resin emulsion. The resulting mixture was added to a stirring solution of CABOT IJX56 carbon black. The ink mixture was stirred with a stir bar for about 5 to about 10 minutes, and the resulting ink mixture was filtered through a 1 μm glass fiber filter. The resulting ink was comprised of 4 percent by weight of CABOT IJX56 carbon black, 23.2 percent by weight of sulfolane, 6 percent by weight of 2-pyrrolidinone, 0.05 percent by weight of polyethyleneoxide ($M_w$=18,500), 5 percent by weight of the poly(glycidyl methacrylate-butyl methacrylate-methacrylic acid) resin emulsion, and 65.75 percent by weight of water.

EXAMPLE II

An epoxy latex emulsion comprised of polymer particles derived from emulsion polymerization of glycidyl methacrylate, benyl methacrylate, methacrylic acid, 10/85/5 parts (by weight), was prepared as follows.

A 500 milliliter jacketed glass flask equipped with a mechanical stirrer, 1.2 grams of ammonium persulfate, 2 grams of sodium dodecylbenzene sulfonate obtained from Aldrich, 2 grams of Triton X-100 (alkylphenoxypolyethanol) available from Union Carbide, and 320 grams of deionized water were deaerated for 30 minutes. A monomer mixture of 8 grams of glycidyl methacrylate, 68 grams of benzyl methacrylate, and 4 grams of methacrylic acid, and 1.6 grams of dodecanethiol and 1.6 grams of carbon tetrabromide was charged into the flask and was emulsified for 10 minutes at room temperature. This emulsion was then polymerized at 70° C. for 6 hours in a nitrogen atmosphere. The resulting latex polymer, poly (glycidyl methacrylate-benzyl methacrylate-methacrylic acid), after cooling throughout possessed an weight average molecular weight $M_w$ of 43,000, an a number average molecular weight $M_n$ of 14,100, as determined on a Waters GPC, and a glass transition temperature of 44° C., as measured on a Seiko DSC. The latex polymer, or latex resin possessed a volume average diameter for the polymer of 156 nanometers as measured by light scattering technique on a Coulter N4 Plus Particle Sizer. The resin emulsion product was comprised of 21 percent by weight of poly(glycidyl methacrylate-benzyl methacrylate-methacrylic acid) resin, 0.5 percent by weight of sodium dodecylbenzene sulfonate, 0.5 percent by weight of Triton X-100 (alkylphenoxypolyethanol), and 78 percent by weight of water.

EXAMPLE IIA

An ink comprised of 4 percent by weight of CABOT IJX56 carbon black obtained from Cabot Corporation, 23.2 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 5 percent by weight of the resin emulsion of Example II (the resin emulsion was comprised of 21 percent by weight of poly(glycidyl methacrylate-benzyl methacrylate-methacrylic acid) resin, 0.5 percent by weight of sodium dodecylbenzene sulfonate, 0.5 percent by weight of Triton X-100 (alkylphenoxypolyethanol), and 78 percent by weight of water) was prepared by dissolution of the polyethyleneoxide in water through simple agitation using a stir bar for about 5 minutes, followed by the addition of sulfolane, 2-pyrrolidinone and resin emulsion. This mixture was added to a stirring solution of CABOT IJX56 carbon black. The ink mixture was stirred with a stir bar for about 5 to about 10 minutes, and the resulting ink mixture was filtered through a 1 μm glass fiber filter. The resulting ink was comprised of 4 percent by weight of CABOT IJX56 carbon black, 23.2 percent by weight of sulfolane, 6 percent by weight of 2-pyrrolidinone, 0.05 percent by weight of polyethyleneoxide ($M_w$=18,500), 5 percent by weight of the poly(glycidyl methacrylate-benzyl methacrylate-methacrylic acid) resin emulsion, and 65.75 percent by weight of water.

EXAMPLE III

A 500 milliliter jacketed glass flask equipped with a mechanical stirrer, 1.2 grams of ammonium persulfate, 2 grams of sodium dodecylbenzene sulfonate obtained from Aldrich, 2 grams of Triton X-100 (alkylphenoxypolyethanol) available from Union Carbide, and 320 grams of deionized water were deaerated for 30 minutes. A monomer mixture of 6.4 grams of glycidyl acrylate, 69.6 grams of butyl methacrylate, 4 grams of methacrylic acid, 1.6 grams of dodecanethiol and 1.6 grams of carbon tetrabromide was charged into the flask and was emulsified for 10 minutes at room temperature. This emulsion was then polymerized at 70° C. for 7 hours in a nitrogen atmosphere. The resulting latex polymer, poly(glycidyl acrylate-butyl methacrylate-methacrylic acid), after cooling throughout possessed an weight average molecular weight $M_w$ of 40,000, an a number average molecular weight $M_n$ of 12,300, as determined on a Waters GPC, and a glass transition temperature of 39° C., as measured on a Seiko DSC. The latex polymer, or latex resin possessed a volume average diameter for the polymer of 172 nanometers as measured by light scattering technique on a Coulter N4 Plus Particle Sizer. The resin emulsion product was comprised of 20.1 percent by weight of poly(glycidyl acrylate-butyl methacrylate-methacrylic acid) resin, 0.5 percent by weight of sodium dodecylbenzene sulfonate, 0.5 percent by weight of Triton X-100 (alkylphenoxypolyethanol), and 78.9 percent by weight of water.

EXAMPLE IIIA

An ink comprised of 4 percent by weight of CABOT IJX56 carbon black obtained from Cabot Corporation, 23.2 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 5 percent by weight of resin emulsion generated from Example III (the resin emulsion comprised of 20.1 percent by weight of poly(glycidyl acrylate-butyl methacrylate-methacrylic acid) resin, 0.5 percent by weight of sodium dodecylbenzene sulfonate, 0.5 percent by weight of Triton X-100 (alkylphenoxypolyethanol), and 78.9 percent by weight of water) was prepared by dissolution of the polyethyleneoxide in water through simple agitation using a stir bar for about 5 minutes, followed by the addition of sulfolane, 2-pyrrolidinone and resin emulsion. This mixture was added to a stirring solution of CABOT IJX56 carbon black. The ink mixture was stirred with a stir bar for about 5 to about 10 minutes, and the resulting ink mixture was filtered through a 1 μm glass fiber filter. The resulting ink was comprised of 4 percent by weight of CABOT IJX56 carbon black, 23.2 percent by weight of sulfolane, 6 percent by weight of 2-pyrrolidinone, 0.05 percent by weight of polyethyleneoxide ($M_w$=18,500), 5 percent by weight of the poly(glycidyl acrylate-butyl methacrylate-methacrylic acid) resin emulsion, and 65.75 percent by weight of water.

EXAMPLE IV

An epoxy latex emulsion comprised of polymer particles obtained from emulsion polymerization of allyl glycidyl ether, butyl methacrylate, methacrylic acid, 6/89/5 parts (by weight), was prepared as follows.

A 500 milliliter jacketed glass flask equipped with a mechanical stirrer, 1.2 grams of ammonium persulfate, 2 grams of sodium dodecylbenzene sulfonate obtained from Aldrich, 2 grams of Triton X-100 (alkylphenoxypolyethanol) available from Union Carbide, and 320 grams of deionized water were deaerated for 30 minutes. A monomer mixture of 4.8 grams of allyl glycidyl ether, 71.2 grams of butyl methacrylate, 4 grams of methacrylic acid, 1.6 grams of dodecanethiol and 1.6 grams of carbon tetrabromide was charged into the flask and was emulsified for 10 minutes at room temperature. This emulsion was then polymerized at 70° C. for 7 hours in a nitrogen atmosphere. The resulting latex polymer, poly(allyl glycidyl ether-butyl methacrylate-methacrylic acid), after cooling throughout possessed an weight average molecular weight $M_w$ of 34,000, an a number average molecular weight $M_n$ of 13,000, as determined on a Waters GPC, and a glass transition temperature of 42° C., as measured on a Seiko DSC. The latex polymer, or latex resin possessed a volume average diameter for the polymer of 148 nanometers as measured by light scattering technique on a Coulter N4 Plus Particle Sizer. The resin emulsion product was comprised of 20.5 percent by weight of poly(allyl glycidyl ether-butyl methacrylate-methacrylic acid) resin, 0.5 percent by weight of sodium dodecylbenzene sulfonate, 0.5 percent by weight of Triton X-100 (alkylphenoxypolyethanol), and 78.5 percent by weight of water.

EXAMPLE IVA

An ink comprised of 4 percent by weight of CABOT IJX56 carbon black obtained from Cabot Corporation, 23.2 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 5 percent by weight of resin emulsion obtained from Example IV (the resin emulsion was comprised of 20.5 percent by weight of poly(allyl glycidyl ether-butyl methacrylate-methacrylic acid) resin, 0.5 percent by weight of sodium dodecylbenzene sulfonate, 0.5 percent by weight of Triton X-100 (alkylphenoxypolyethanol), and 78.5 percent by weight of water) was prepared by dissolution of the polyethyleneoxide in water through simple agitation using a stir bar for about 5 minutes, followed by the addition of sulfolane, 2-pyrrolidinone and resin emulsion. This mixture was added to a stirring solution of CABOT IJX56 carbon black. The resulting ink mixture was stirred with a stir bar for about 5 to about 10 minutes, and the resulting ink mixture was filtered through a 1 μm glass fiber filter. The resulting ink was comprised of 4 percent by weight of CABOT IJX56 carbon black, 23.2 percent by weight of sulfolane, 6 percent by weight of 2-pyrrolidinone, 0.05 percent by weight of polyethyleneoxide ($M_w$=18,500), 5 percent by weight of the poly(allyl glycidyl ether-butyl methacrylate-methacrylic acid) resin emulsion, and 65.75 percent by weight of water.

COMPARATIVE EXAMPLE 1

A latex emulsion comprised of polymer particles derived from emulsion polymerization of butyl methacrylate and methacrylic acid, 92/8 parts (by weight), was prepared as follows.

A 500 milliliter jacketed glass flask equipped with a mechanical stirrer, 1.2 grams of ammonium persulfate, 2 grams of sodium dodecylbenzene sulfonate obtained from Aldrich, 2 grams of Triton X-100 (alkylphenoxypolyethanol) available from Union Carbide, and 320 grams of deionized water were deaerated for 30 minutes. A monomer mixture of 73.6 grams of butyl methacrylate, 6.4 grams of methacrylic acid, 1.6 grams of dodecanethiol and 1.6 grams of carbon tetrabromide was charged into the flask and was emulsified for 10 minutes at room temperature. This emulsion was then polymerized at 70° C. for 5.5 hours in a nitrogen atmosphere. The resulting latex polymer, poly(butyl methacrylate-methacrylic acid), after cooling throughout possessed an weight average molecular weight $M_w$ of 37,000, a number average molecular weight $M_n$ of 12,500, as determined on a Waters GPC, and a glass transition temperature of 42° C., as measured on a Seiko DSC. The latex polymer, or latex resin possessed a volume average diameter for the polymer of 140 nanometers as measured by light scattering technique on a Coulter N4 Plus Particle Sizer. The resin emulsion product was comprised of 21.2 percent by weight of poly(butyl methacrylate-methacrylic acid) resin, 0.5 percent by weight of sodium dodecylbenzene sulfonate, 0.5 percent by weight of Triton X-100 (alkylphenoxypolyethanol), and 77.8 percent by weight of water.

COMPARATIVE EXAMPLE 1A

In ink comprised of 4 percent by weight of CABOT IJX56 carbon black, obtained from Cabot Corporation, 23.2 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences), and 5 percent by weight of resin emulsion derived from Comparative Example 1 (the resin emulsion was comprised of 21.2 percent by weight of poly(butyl methacrylate-methacrylic acid) resin, 0.5 percent by weight of sodium dodecylbenzene sulfonate, 0.5 percent by weight of Triton X-100 (alkylphenoxypolyethanol), and 77.8 percent by weight of water) was prepared by dissolution of the polyethyleneoxide in water through simple agitation using a stir bar for about 5 minutes, followed by the addition of sulfolane, 2-pyrrolidinone and resin emulsion. This mixture was added to a stirring solution of CABOT IJX56 carbon black. The ink mixture was stirred with a stir bar for about 5 to about 10 minutes, and the resulting ink mixture was filtered through a 1 μm glass fiber filter. The resulting ink was comprised of 4 percent by weight of CABOT IJX56 carbon black, 23.2 percent by weight of sulfolane, 6 percent by weight of 2-pyrrolidinone, 0.05 percent by weight of polyethyleneoxide ($M_w$=18,500), 5 percent by weight of the poly(butyl methacrylate-methacrylic acid) resin emulsion, and 65.75 percent by weight of water.

Physical Properties of the Inks and Stability Testing Measured at 25° C.

Physical Properties of the Inks and Stability Testing Measured at 25° C.

|  |  |  |  | 60° C./24 Hour Heat Treatment | | |
| --- | --- | --- | --- | --- | --- | --- |
| Example | Viscosity cPs | Surface Tension D/cm | pH | Viscosity cPs | Surface Tension D/cm | pH |
| IA | 2.23 | 35.7 | 6.79 | 2.14 | 36.4 | 6.62 |
| IIA | 2.20 | 36.8 | 6.58 | 2.10 | 37.8 | 6.43 |
| IIIA | 1.92 | 38.2 | 6.74 | 1.86 | 39.0 | 6.64 |
| IVA | 2.23 | 35.9 | 6.79 | 2.20 | 36.5 | 6.70 |
| Comparative 1A | 2.21 | 38.4 | 6.70 | 2.30 | 39.0 | 6.60 |

In the above Examples, the inks invention exhibited excellent stability. Large changes greater than 0.3 centipoise units for viscosity indicated instability. Other physical properties, such as surface tension or pH, were monitored, and changes of 3 dynes/cm or a change in pH by more than about 0.5 would indicate instability. The invention inks were shelf stable with no evidence of settling or precipitates for at least 8 months at about 25° C., while the comparative inks evidenced settling after about 2 months. For the invention inks, substantially constant viscosity, pH, and surface tension were maintained despite stressing the ink by, permitting the ink to remain in a bottle at room temperature, for example about 25° C., then subjecting the ink to heating at about 60° C. for 24 hours. Under these stress conditions, the viscosity of the ink did not substantially increase or decrease more than about 0.5 cPs (centipoise), the surface tension of the ink does not substantially increase or decrease more than about 1 dyne/cm. Large changes greater than 0.3 centipoise units for viscosity indicated instability. Other physical properties, such as surface tension or pH, were monitored, and changes of 3 dynes/cm or a change in pH by more than about 0.5 would indicate instability.

Optical Density and Smear Attributes (Lower Number Value Indicates Less Smear)

|  | Optical Density | | Smear OD | |
| --- | --- | --- | --- | --- |
| Example | Xerox 4024DP | Image Series LX | Xerox 4024DP | Image Series LX |
| IA | 1.54 | 1.57 | 0.03 | 0.03 |
| IIA | 1.53 | 1.57 | 0.03 | 0.04 |
| IIIA | 1.52 | 1.58 | 0.04 | 0.05 |
| IVA | 1.50 | 1.56 | 0.04 | 0.06 |
| Comparative 1A | 1.53 | 1.57 | 0.12 | 0.14 |

Wet Smear Resistance Optical Density

|  | Wet Smear OD | |
| --- | --- | --- |
| Example | Xerox 4024DP | Image Series LX |
| IA | 0.05 | 0.05 |
| IIA | 0.06 | 0.07 |

-continued

| Example | Wet Smear OD | |
|---|---|---|
| | Xerox 4024DP | Image Series LX |
| IIIA | 0.06 | 0.08 |
| IVA | 0.05 | 0.07 |
| Comparative 1A | 0.20 | 0.21 |

The wet smear resistance was improved and was from about 0.05 to about 0.08 with the above invention inks containing the epoxy resin emulsions. The wet smear OD for latex polymer without epoxy groups was about from 0.20 to about 0.21.

Other modifications of the present invention may occur to those skilled in the art subsequent to a review of the present application and these modifications, including equivalents thereof, are intended to be included within the scope of the present invention.

What is claimed is:

1. A process for the preparation of an ink jet ink which comprises mixing an ink vehicle, a colorant and a latex containing a polymer with epoxy groups, and wherein said latex is generated by the polymerization of a mixture of olefinic monomers, and wherein at least one of said olefinic monomers is an unsaturated epoxide monomer, and which polymerization is accomplished in the presence of an anionic surfactant, and a nonionic surfactant.

2. A process in accordance with claim 1 wherein said mixture of olefinic monomers contains from about 2 to about 10 monomers.

3. A process in accordance with claim 1 wherein said olefinic mixture of olefinic monomers contains from about 2 to about 5 monomers.

4. A process in accordance with claim 1 wherein said olefinic monomers are comprised of said unsaturated epoxide monomer, an alkyl acrylate, and an alkyl methacrylate.

5. A process in accordance with claim 1 wherein said olefinic monomers are comprised of said (1) unsaturated epoxide monomer, and (2) an alkyl acrylate, an alkyl methacrylate, a benzyl methacrylate, an acrylonitrile, a styrene functional, or an acid olefinic monomer.

6. A process in accordance with claim 1 wherein the mixture of olefinic monomers is comprised of monomers of an unsaturated epoxide, an alkyl acrylate, an alkyl methacrylate, a benzyl methacrylate, an acrylonitrile, an acid olefinic monomer wherein said unsaturated epoxide monomer is glycidyl acrylate, glycidyl methacrylate, allyl glycidyl ether or mixtures thereof present in an amount of from about 0.2 to about 15 weight percent, ethylenically unsaturated ester of an alkyl acrylate, an alkyl methacrylate, a benzyl methacrylate, an acrylonitrile, or a styrene functional monomer present in an amount of from about 70 to about 95 percent by weight, and an olefinic acidic monomer of acrylic acid or methacrylic acid, and is present in an amount of from about 1 to about 15 weight percent based on the total amount of monomers selected to generate polymer.

7. A process in accordance with claim 1 wherein said ink further contains ink additives, wherein the ink additives are selected from a group consisting of biocides, humectants, polymeric additives, and stabilizing agents.

8. A process in accordance with claim 7 wherein said unsaturated epoxide monomer is, allyl glycidyl ether, glycidyl acrylate, or glycidyl methacrylate.

9. A process in accordance with claim 7 wherein said additives are present in an amount of from about 0.01 to about 7 percent by weight.

10. A process in accordance with claim 7 wherein said ink additives are selected, and wherein said ink additives are selected in an amount of from 0 to about 20 percent weight based on the total amount of components in the ink, and which total is about 100 percent, or 100 parts.

11. A process in accordance with claim 1 wherein said unsaturated epoxide monomer contains oxirane functionality and pendant ethylenic double bond unsaturation.

12. A process in accordance with claim 1 wherein there is selected a mixture of olefinic monomers comprised of glycidyl methacrylate/butyl methacrylate/methacrylic acid, glycidyl methacrylate/benzyl methacrylate/methacrylic acid, glycidyl acrylate/butyl methacrylate/methacrylic acid, allyl glycidyl ether/butyl methacrylate/methacrylic acid, and there is formed a polymer of glycidyl methacrylate/butylmethacrylate/methacrylic acid, or glycidyl methacrylate/benyl methacrylate/methacrylic acid, glycidyl acrylate/butyl methacrylate/methacrylic acid, or allyl glycidyl ether/butyl methacrylate/methacrylic acid, respectively.

13. A process in accordance with claim 1 wherein said mixture of monomers is comprised of an unsaturated epoxide monomer, alkyl acrylate, alkyl methacrylate, benzyl methacrylate, acrylonitrile, styrene functional monomers, or acid olefinic monomer, and the polymer formed is poly(glycidyl acrylate-butyl methacrylate-methacrylic acid), poly(glycidyl acrylate-benzyl methacrylate-methacrylic acid), poly(glycidyl methacrylate-butyl methacrylate-methacrylic acid), poly(glycidyl methacrylate-benzyl methacrylate- methacrylic acid), and poly(allyl glycidyl ether-butyl methacrylate-methacrylic acid), poly(allyl glycidyl ether-benzyl methacrylate-methacrylic acid), and wherein the epoxy latex polymer possesses a number average molecular weight $M_n$ of from about 1,000 grams per mole to about 30,000 grams per mole, and the weight average molecular weight $M_w$ thereof is from about 1,500 grams per mole to about 60,000 grams per mole.

14. A process in accordance with claim 1 wherein the generated polymer possesses glass transition temperature is from about 0 to about 60° C., and which polymer is generated from said monomer mixture.

15. A process in accordance with claim 1 wherein the generated polymer possesses a glass transition temperature is from about 25° C. to about 50° C., and which polymer is generated from said monomer mixture.

16. A process in accordance with claim 1 wherein a mixture of from about 2 to about 7 monomers is selected.

17. A process in accordance with claim 1 wherein the anionic surfactant is sodium dodecyl sulfate, sodium dodecylbenzene sulfonate, sodium dodecyl naphthalene sulfate, sodium dodecyl diphenyloxide disulfonate, or sodium N-decyl diphenyloxide disulfonate.

18. A process in accordance with claim 1 wherein the anionic surfactant is sodium dodecylbenzene sulfonate.

19. A process in accordance with claim 1 wherein the nonionic surfactant is polyvinyl alcohol, polyacrylic acid, methyl cellulose, polyoxyethylene octylphenyl ether, or polyoxyethylene nonylphenyl ether.

20. A process in accordance with claim 1 wherein the nonionic surfactant is polyoxyethylene octylphenyl ether.

21. A process in accordance with claim 1 wherein the anionic surfactant is selected in an amount of from about 0.1 to about 10 weight percent based primarily on the total weight percent amount of monomers, anionic surfactant, and nonionic surfactant.

22. A process in accordance with claim 1 wherein the anionic surfactant is selected in an amount of from about 0.5 to about 5 weight percent based on the total weight percent amount of monomers, ionic surfactant, and nonionic surfactant.

23. A process in accordance with claim 1 wherein the nonionic surfactant is selected in an amount of from about 0.1 to about 6 weight percent based on the total weight percent amount of monomer, anionic surfactant, and nonionic surfactant.

24. A process in accordance with claim 1 wherein the nonionic surfactant is selected in an amount of from about 0.5 to about 3 weight percent based on the total weight percent amount of monomers, anionic surfactant, and nonionic surfactant.

25. A process in accordance with claim 1 wherein the ratio amount of anionic surfactant to nonionic surfactant is from about 1 to about 5.

26. A process in accordance with claim 1 wherein the colorant is a dye.

27. A process in accordance with claim 1 wherein the colorant is a pigment.

28. A process in accordance with claim 1 wherein said colorant possesses a particle size distribution wherein at least about 90 percent of said pigment particles have a diameter of about 0.1 µm with the remaining pigment particles being of a diameter of about 1.0 µm.

29. A process in accordance with claim 1 wherein the latex contains water.

30. A process in accordance with claim 1 wherein the amount of monomers selected are from about 90 to about 99, the amount of anionic surfactant is from about 0.1 to about 10, and the amount of nonionic surfactant is from about 0.1 to about 6, each based on the weight percent of the total weight percent amount of monomer, anionic surfactant, and nonionic surfactant.

31. A process in accordance with claim 1 wherein said ink vehicle is selected in an amount of from about 40 to about 99 weight percent based on the total amount of components in said ink.

32. A process in accordance with claim 1 wherein the vehicle is water, a glycol, or a mixture of glycols.

33. A process in accordance with claim 1 wherein said vehicle is water, a glycol, a mixture of glycols, or a mixture of water, and a miscible organic component of ethylene glycol, propylene glycol, diethylene glycols, glycerine, dipropylene glycols, polyethylene glycols, and polypropylene, and wherein the water to organic vehicle ratio is from about 100:0 to about 30:70.

34. A process in accordance with claim 33 wherein the substrate is paper, and there is selected a printer having at least one nozzle of a channel width or diameter ranging from about 10 to about 40 microns and intercolor bleed is minimized or eliminated, and wherein said printing process is optionally accomplished with a 600 spi ink jet printer with a radiant heat assisting drying process.

35. A process in accordance with claim 33 wherein said ratio is from about 97:3 to about 50:50.

36. A process accordance with claim 1 further containing ink additives of surfactants of poly(ethylene glycol) monolaurate, poly(ethylene glycol) monoricinoleate, poly(ethylene glycol) lanolin alcohol ether, poly(ethylene glycol) monooleate, poly(ethylene glycol) castor oil, poly(ethylene glycol) tetramethyl decynediol, or poly(ethylene glycol) lanolin, and which surfactants are present in an amount of from about 0.01 to about 7 weight percent or parts based on the total amount of ink components and which total is about 100 percent.

37. A process in accordance with claim 1 further containing ink additives of a biocide, a humectant, or mixtures thereof, and wherein said biocide is present in an amount of from 0 to about 10 percent by weight, and said humectant is present in an amount of from 0 to about 50 percent by weight based primarily on the total amount of components in the ink.

38. A high resolution printing process wherein high is from about 300 to about 1,000 dots per inch comprising applying in imagewise fashion to a substrate an ink composition obtained by the process of claim 1.

39. A process for reducing or eliminating paper curl and avoiding or minimizing smear in a xerographic ink jet apparatus which comprises generating images in said apparatus and developing said images with the ink composition of claim 1.

40. A process in accordance with claim 1 wherein subsequent to polymerization at a temperature of from about 20° C. to about 100° C., there is formed the epoxy containing polymer of (poly(glycidyl methacrylate-butyl methacrylate-methacrylic acid), poly(glycidyl acrylate-butyl methacrylate-methacrylic acid), poly(allyl glycidyl ether-butyl methacrylate-methacrylic acid); wherein the epoxy polymer in the polymer emulsion is comprised of from about 0.05 to about 10 weight percent of epoxy groups based on the epoxy polymer; the epoxy latex polymer possesses a number average molecular weight $M_n$ of from about 500 to about 50,000, and a weight average molecular weight $M_w$ of from about 1,000 to about 80,000.

41. A process in accordance with claim 40 wherein said $M_n$ is from about 1,000 to about 30,000 grams per mole, and said $M_w$ is from about 1,500 to about 60,000 grams per mole.

42. A process in accordance with claim 1 wherein the polymer formed is selected from the group consisting of poly(glycidyl methacrylate-butyl methacrylate-acrylic acid), poly(glycidyl methacrylate-benzyl methacrylate-acrylic acid), poly(glycidyl methacrylate-butyl acrylate-acrylic acid), poly(glycidyl acrylate-butyl methacrylate-acrylic acid), poly(glycidyl acrylate-benzyl methacrylate-acrylic acid), poly(glycidyl acrylate-butyl acrylate-acrylic acid), poly(glycidyl methacrylate-butyl methacrylate-methacrylic acid), poly(glycidyl methacrylate-benzyl methacrylate-methacrylic acid), poly(glycidyl methacrylate-butyl acrylate-methacrylic acid), poly(glycidyl acrylate-butyl methacrylate-methacrylic acid), poly(glycidyl acrylate-benzyl methacrylate-methacrylic acid), poly(glycidyl acrylate-butyl acrylate-methacrylic acid), poly(allyl glycidyl ether-butyl methacrylate-acrylic acid), poly(allyl glycidyl ether-benzyl methacrylate-acrylic acid), poly(allyl glycidyl ether-butyl acrylate-acrylic acid), poly(allyl glycidyl ether-styrene-methacrylic acid), poly(allyl glycidyl ether-butyl methacrylate-methacrylic acid), poly(allyl glycidyl ether-benzyl methacrylate-methacrylic acid), poly(allyl glycidyl ether-butyl acrylate-methacrylic acid), poly(glycidyl acrylate-acrylonitrile-methacrylic acid), poly(glycidyl methacrylate-acrylonitrile-acrylic acid), poly(glycidyl acrylate-acrylonitrile-methacrylic acid), and poly(glycidyl methacrylate-acrylonitrile-methacrylic acid).

43. A process for the preparation of an ink jet ink which consists essentially of mixing an ink vehicle, a colorant and a latex containing a polymer with epoxy groups, and wherein said latex is generated by the polymerization of a mixture of olefinic monomers, and wherein at least one of said olefinic monomers is an unsaturated epoxide monomer, and which polymerization is accomplished in the presence of an anionic surfactant, and a nonionic surfactant.

* * * * *